United States Patent
Singh et al.

(10) Patent No.: US 11,765,654 B2
(45) Date of Patent: Sep. 19, 2023

(54) POWER SAVING IN RADIO ACCESS NETWORK

(71) Applicant: NOKIA SOLUTIONS AND NETWORKS OY, Espoo (FI)

(72) Inventors: Vaibhav Singh, Bangalore (IN); Anand Bedekar, Glenview, IL (US); Jun He, Shanghai (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/976,376

(22) Filed: Oct. 28, 2022

(65) Prior Publication Data
US 2023/0135872 A1 May 4, 2023

(30) Foreign Application Priority Data
Oct. 28, 2021 (FI) ..................................... 20216111

(51) Int. Cl.
*H04W 52/02* (2009.01)
*H04W 24/10* (2009.01)

(52) U.S. Cl.
CPC ....... *H04W 52/0206* (2013.01); *H04W 24/10* (2013.01)

(58) Field of Classification Search
CPC .......................... H04W 52/0206; H04W 24/10
USPC ....................................................... 370/318
See application file for complete search history.

(56) References Cited

U.S. PATENT DOCUMENTS

| 2015/0078261 | A1 | 3/2015 | Yu et al. |
| 2017/0026888 | A1 | 1/2017 | Kwan |
| 2021/0119881 | A1* | 4/2021 | Shirazipour ............ H04L 41/40 |
| 2021/0258866 | A1 | 8/2021 | Chou |
| 2021/0297876 | A1 | 9/2021 | Bellamkonda |
| 2022/0141766 | A1* | 5/2022 | Choi ...................... H04W 24/08 370/311 |
| 2022/0343220 | A1* | 10/2022 | Sawabe .................. G06N 20/20 |
| 2023/0116202 | A1* | 4/2023 | Mendo Mateo ......... G06N 3/08 370/328 |

FOREIGN PATENT DOCUMENTS

| EP | 3869847 A1 | 8/2021 |
| WO | 2020131128 A1 | 6/2020 |
| WO | WO-2022207402 A1 * | 10/2022 |

OTHER PUBLICATIONS

Mismar et al., Deep Reinforcement Learning for 5G Networks, Mar. 2020, IEEE transactions on communications, vol. 68, No. 3, 12 pages (Year: 2020).*

(Continued)

*Primary Examiner* — Mong-Thuy T Tran
(74) *Attorney, Agent, or Firm* — SQUIRE PATTON BOGGS (US) LLP

(57) ABSTRACT

To maximize power saving in a radio access network comprising cells, an optimal action amongst actions comprising switching on one or more cells, switching off one or more cells, and doing nothing is determined using a trained model, which maximizes a long term reward on tradeoff between throughput and power, the trained model taking as input a load estimate. The trained model may be updated online using measurement results on load, throughput and power consumption.

12 Claims, 6 Drawing Sheets

(56) References Cited

OTHER PUBLICATIONS

Office Action dated Mar. 7, 2022 corresponding to Finnish Patent Application No. 20216111.
Search Report dated Mar. 7, 2022 corresponding to Finnish Patent Application No. 20216111.
Communication of Acceptance—section 29 a of Patents Decree dated Oct. 12, 2022 corresponding to Finnish Patent Application No. 20216111.
Y. Gao et al., "Machine Learning based Energy Saving Scheme in Wireless Access Networks," In: 2020 International Wireless Communications and Mobile Computing (IWCMC), Jun. 15, 2020, pp. 1573-1578.
I. Donevski et al., Neural networks for cellular base station switching. In: 2019 INFOCOM IEEE Conference on Computer Communications Workshops, INFOCOM WKSHPS 2019, Apr. 29, 2019, pp. 738-743.
H. Farooq et al., "Mobility prediction-based autonomous proactive energy saving (AURORA) framework for emerging ultra-dense networks," In: IEEE Trans. on Green Communications and Networking, Dec. 2018, vol. 2, No. 4, pp. 958-971.
S. Wu et al., "Deep convolutional neural network assisted reinforcement learning based mobile network power saving," In: IEEE Access, May 15, 2020, vol. 8, pp. 93671-93681.
The partial European Search Report dated Mar. 20, 2023, corresponding to European Patent Application No. 22203716.0.
Intel Corporation: "Use cases for AI/ML enabled NG-RAN", 3GPP Draft; R3-212301, 3rd Generation Partnership Project (3GPP), Mobile Competence Centre ; 650, Route Des Lucioles ; F-06921 Sophia-Antipolis Cedex ; France, vol. RAN WG3, No. Electronic meeting; May 17, 2021-May 28, 2021 May 7, 2021.
Kaloxylos Alexandros et al: "AI and ML—Enablers for Beyond 5G Networks", Dec. 1, 2020.
Notice of Reasons for Rejection issued in corresponding Japanese Patent Application No. 2022-172404 dated Apr. 17, 2023, with English language summary thereof.
Ericsson, "Network Energy Saving", 3GPP TSG-RAN WG3 Meeting #114-e, R3-215216, Oct. 21, 2021.
Extended European Search Report issued in corresponding European Patent Application No. 22203716.0 dated Jul. 27, 2023.

* cited by examiner

POWER SAVING IN RADIO ACCESS NETWORK

CROSS REFERENCE TO RELATED APPLICATION

This application claims the benefit of Finnish Patent Application No. 20216111, filed Oct. 28, 2021. The entire content of the above-referenced application is hereby incorporated by reference.

TECHNICAL FIELD

Various example embodiments relate to wireless communications.

BACKGROUND

Wireless communication systems are under constant development. For example, reducing cell size and increasing cell density have been the main source of enhancing network throughput. A side effect is that power consumption has increased. To enable power saving, some of the cells may be switched off without affecting to the network throughput if a load in the network is low enough, and switched on when there is more load. Usually the decision to switch on or off a cell is made based on received load information and a preset threshold. Determining the preset threshold to maximize the power savings and yet not affecting the network throughput is challenging.

BRIEF DESCRIPTION

According to an aspect there is provided an apparatus comprising at least one processor; and at least one memory including computer program code, the at least one memory and computer program code being configured to, with the at least one processor, cause the apparatus at least to perform: determining, for a group of cells in a radio access network, an optimal action, using a first trained model, which is based on reinforcement learning and maximizes a long term reward on tradeoff between throughput and power saving within the group of cells, the first trained model taking as input a state, wherein the optimal action is one of actions comprising at least switching on one or more cells, switching off one or more cells, and retaining the current cell statuses in cells of the group of cells, and wherein the state comprises at least one of a load estimate and, per a cell in the group of cells, a current cell status; and causing the optimal action to be performed in response to the optimal action being either switching on one or more cells or switching off one or more cells.

In an embodiment, the at least one memory and computer program code are configured to, with the at least one processor, cause the apparatus further at least to perform: applying a freeze time after an optimal action that is either switching on one or more cells or switching off one or more cells is caused to be performed, wherein during the freeze time switching on the one or more cells or switching off the one or more cells is not possible.

In embodiments, the at least one memory and computer program code are configured to, with the at least one processor, cause the apparatus further at least to perform: receiving load and performance metrics of cells that are switched on, and power consumed by the cells that are switched on; and updating the first trained model in response to the receiving load and performance metrics of cells that are switched on, and power consumed by the cells that are switched on.

In embodiments, the at least one memory and computer program code are configured to, with the at least one processor, cause the apparatus further at least to perform the determining in response to receiving, as a new load estimate, a new load prediction from a second trained model comprised in the apparatus or in another apparatus, the second trained model outputting periodically, using at least measured load data from the radio access network as input, load predictions.

In embodiments, the at least one memory and computer program code are configured to, with the at least one processor, cause the apparatus further at least to perform: instantiating and running the first trained model as a service on top of a radio intelligent controller near real time platform; and using a data write application programming interface of the radio intelligent controller near real time platform, when causing the optimal action to be performed.

According to an aspect there is provided an apparatus comprising at least one processor; and at least one memory including computer program code, the at least one memory and computer program code configured to, with the at least one processor, cause the apparatus at least to perform: initializing a first trainable model, which maximizes a long term reward on tradeoff between throughput and power saving in a radio access network comprising cells and which first trainable model outputs an optimal action, wherein the optimal action is one of actions comprising at least switching on one or more cells, switching off one or more cells, and retaining the current cell statuses; acquiring historical data comprising a plurality of time series of evolution of at least load data, power consumption data, and cell throughput data in the radio access network, time series comprising a plurality of time steps; and training the first trainable model to a first trained model using reinforcement learning and iterating the plurality of time series and by iterating, per a time series, the plurality of time steps.

In embodiments, the at least one memory and computer program code are configured to, with the at least one processor, cause the apparatus further at least to perform: using Q learning as the reinforcement learning.

In embodiments, the actions further comprise modifying power settings of one or more cells.

According to an aspect there is provided a method comprising: determining, for a group of cells in a radio access network, an optimal action, using a first trained model, which is based on reinforcement learning and maximizes a long term reward on tradeoff between throughput and power saving within the group of cells, the first trained model taking as input a state, wherein the optimal action is one of actions comprising at least switching on one or more cells, switching off one or more cells, and retaining the current cell statuses in cells of the group of cells, and wherein the state comprises at least one of a load estimate and, per a cell in the group of cells, a current cell status; and causing the optimal action to be performed in response to the optimal action being either switching on one or more cells or switching off one or more cells.

In an embodiment, the method further comprises: applying a freeze time after an optimal action that is either switching on one or more cells or switching off one or more cells is caused to be performed, wherein during the freeze time switching on the one or more cells or switching off the one or more cells is not possible.

In embodiments, the method further comprises: receiving load and performance metrics of cells that are switched on, and power consumed by the cells that are switched on; and updating the first trained model in response to the receiving load and performance metrics of cells that are switched on, and power consumed by the cells that are switched on.

In embodiments, the method further comprises performing the determining in response to receiving, as a new load estimate, a new load prediction from a second trained model comprised in the apparatus or in another apparatus, the second trained model outputting periodically, using at least measured load data from the radio access network as input, load predictions.

In embodiments, the method further comprises: instantiating and running the first trained model as a service on top of a radio intelligent controller near real time platform; and using a data write application programming interface of the radio intelligent controller near real time platform, when causing the optimal action to be performed.

According to an aspect there is provided a method comprising: initializing a first trainable model, which maximizes a long term reward on tradeoff between throughput and power saving in a radio access network comprising cells and which first trainable model outputs an optimal action, wherein the optimal action is one of actions comprising at least switching on one or more cells, switching off one or more cells, and retaining the current cell statuses; acquiring historical data comprising a plurality of time series of evolution of at least load data, power consumption data, and cell throughput data in the radio access network, time series comprising a plurality of time steps; and training the first trainable model to a first trained model using reinforcement learning and iterating the plurality of time series and by iterating, per a time series, the plurality of time steps.

In embodiments, the method further comprises using Q learning as the reinforcement learning.

In embodiments for the method, the actions further comprise modifying power settings of one or more cells.

According to an aspect there is provided a computer readable medium comprising program instructions for causing an apparatus to perform at least one of a first process and a second process, wherein the first process comprises at least the following: determining, for a group of cells in a radio access network, an optimal action, using a first trained model, which is based on reinforcement learning and maximizes a long term reward on tradeoff between throughput and power saving within the group of cells, the first trained model taking as input a state, wherein the optimal action is one of actions comprising at least switching on one or more cells, switching off one or more cells, and retaining the current cell statuses in cells of the group of cells, and wherein the state comprises at least one of a load estimate and, per a cell in the group of cells, a current cell status; and causing the optimal action to be performed in response to the optimal action being either switching on one or more cells or switching off one or more cells, wherein the second process comprises at least the following: initializing a first trainable model, which maximizes a long term reward on tradeoff between throughput and power saving in a radio access network comprising cells and which first trainable model outputs an optimal action, wherein the optimal action is one of actions comprising at least switching on one or more cells, switching off one or more cells, and retaining the current cell statuses; acquiring historical data comprising a plurality of time series of evolution of at least load data, power consumption data, and cell throughput data in the radio access network, time series comprising a plurality of time steps; and training the first trainable model to a first trained model using reinforcement learning and iterating the plurality of time series and by iterating, per a time series, the plurality of time steps.

In an embodiment, the computer readable medium is a non-transitory computer readable medium.

According to an aspect there is provided a computer program comprising instructions for causing an apparatus to perform at least one of a first process and a second process, wherein the first process comprises at least the following: determining, for a group of cells in a radio access network, an optimal action, using a first trained model, which is based on reinforcement learning and maximizes a long term reward on tradeoff between throughput and power saving within the group of cells, the first trained model taking as input a state, wherein the optimal action is one of actions comprising at least switching on one or more cells, switching off one or more cells, and retaining the current cell statuses in cells of the group of cells, and wherein the state comprises at least one of a load estimate and, per a cell in the group of cells, a current cell status; and causing the optimal action to be performed in response to the optimal action being either switching on one or more cells or switching off one or more cells, wherein the second process comprises at least the following: initializing a first trainable model, which maximizes a long term reward on tradeoff between throughput and power saving in a radio access network comprising cells and which first trainable model outputs an optimal action, wherein the optimal action is one of actions comprising at least switching on one or more cells, switching off one or more cells, and retaining the current cell statuses; acquiring historical data comprising a plurality of time series of evolution of at least load data, power consumption data, and cell throughput data in the radio access network, time series comprising a plurality of time steps; and training the first trainable model to a first trained model using reinforcement learning and iterating the plurality of time series and by iterating, per a time series, the plurality of time steps.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultrawideband (UWB) technology, sensor networks, mobile ad-hoc networks (MANETs) and Internet Protocol multimedia subsystems (IMS) or any combination thereof.

Figure 1:
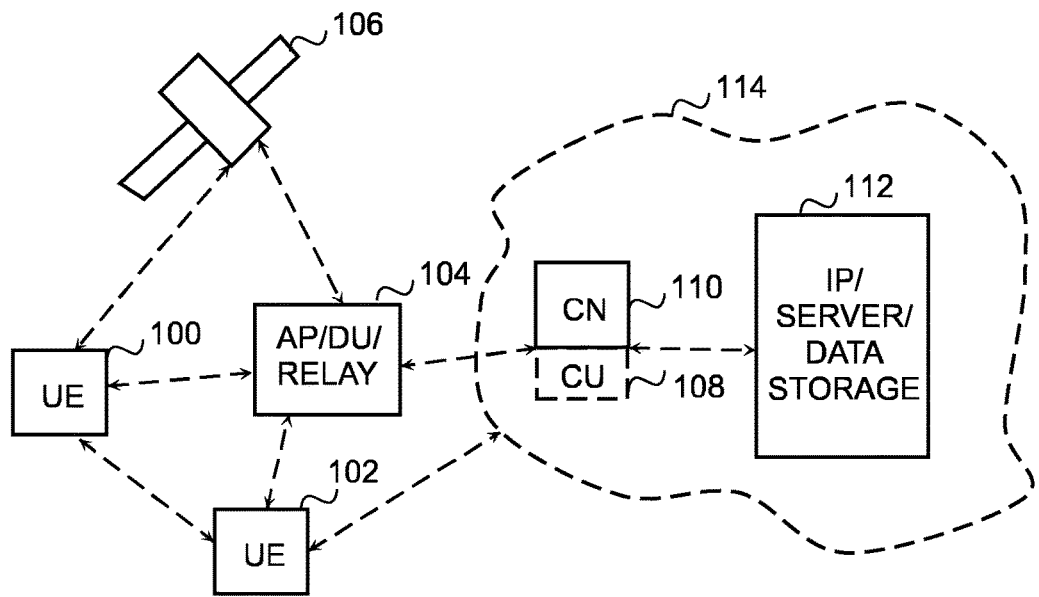
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices. The devices 100 and 102 are configured to be in a wireless connection on one or more communication channels with a node 104. The node 104 is further connected to a core network 110. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 110 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), or access and mobility management function (AMF), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors micro-controllers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home(e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
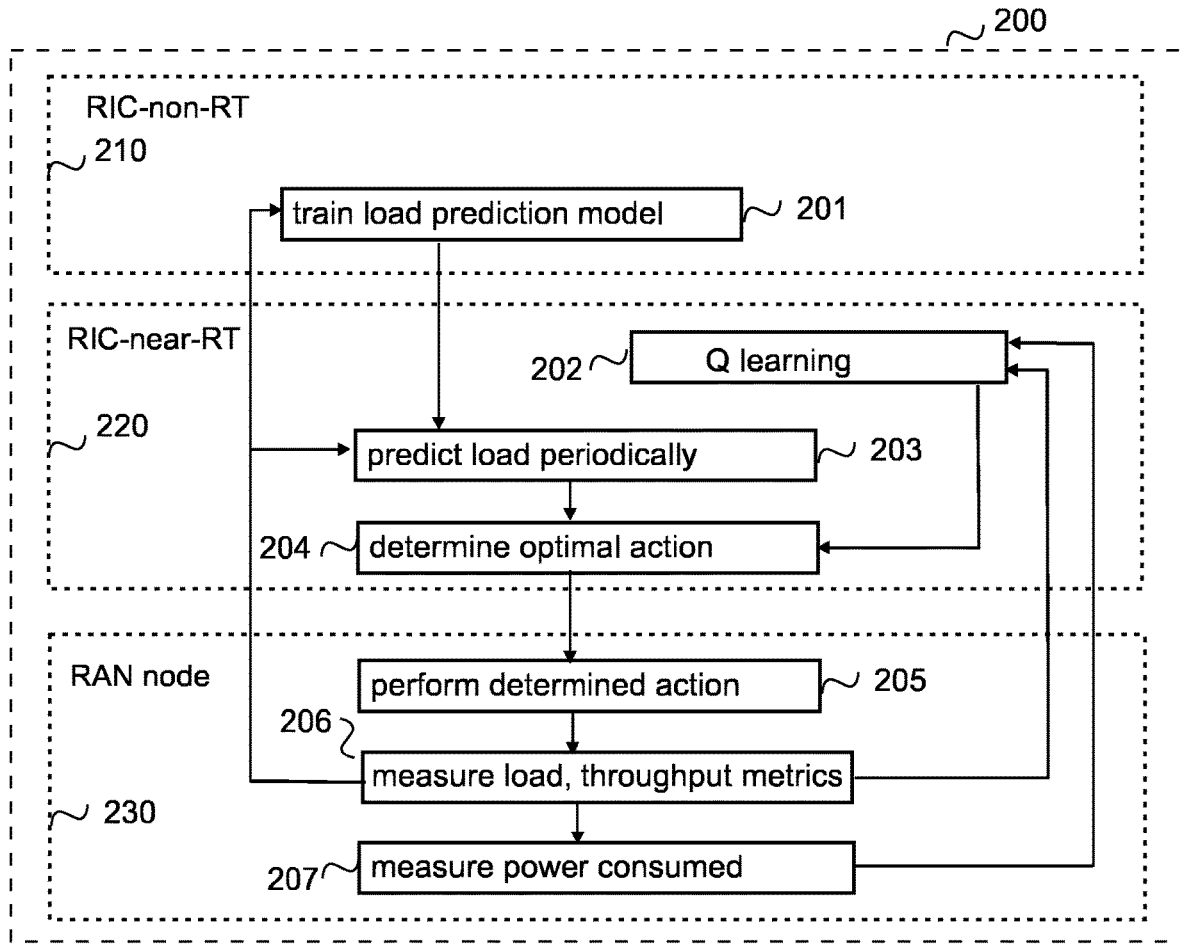
FIG. 2 illustrates an exemplified open radio access network architecture.

FIG. 2 illustrates a neural network based solution to decide whether to change status of one or more cells, i.e. switch on or off one or more cells, or to retain them in their current status. The solution in FIG. 2 is implemented to an open radio access network, O-RAN, which is a radio access network architecture for 5G and beyond, for example. The high-level view of the O-RAN architecture comprise the network functions, a service management and orchestration framework (SMO) to manage the network functions and an O-Cloud (O-RAN Cloud) to host cloudified network functions. However, FIG. 2 provides a highly simplified example of an open radio access network logical architecture disclosing operational entities.

Referring to FIG. 2, O-RAN 200 comprises an open platform to interact and guide the behavior of the radio access network, for example radio access network nodes 230. A radio access network node may be gNB (base station) or a distributed unit, just to mention couple of examples. The open platform may be called xRAN controller or a radio intelligent controller (RIC), and it comprises a non real time part (RIC-non-RT) 210 and a near real time part (RIC-near-RT) 220. The non real time part 210 may be part of the service management and orchestration framework, and the near real time part 220 may be on a radio access side. (The radio access side includes the radio access network nodes.) An interface between the non real time part 210 and the near real time part 220 is A1 interface. An interface between the near real time part 220 and a radio access network node 230 is E2 interface. An interface between the non real time part 210 and a radio access network node 230 is O2 interface. Further, different algorithms, for example optimization algorithms, and services can be instantiated as applications on top of the underlying radio intelligent controller (the open platform). The applications, that can be called "xApps", can interact with the radio intelligent controller by means of one or more application programming interfaces that may be called "API X" and that can be freely defined.

In the example illustrated in FIG. 2, there are two different models, named in the example a load prediction model and Q learning, without limiting the models to the specific examples. In the example illustrated in FIG. 2, training the load prediction model (block 201) is performed in the non real time part 210 of the radio intelligent controller, and the Q learning (block 202), predicting load periodically (block 203) using the trained load prediction model, and determining optimal action (block 204) are performed in the near real time part 220 of the radio intelligent controller. A radio access network node 230 performs determined action (block 205), measures load and throughput metrics (block 206) and measures power consumed (block 207). More precisely, the radio access network node 230 performs the determined action to its transceiver(s), or transmitter(s), or receiver(s), or other radio part(s), or radio head(s) that provide a cell/cells and whose status is to be changed or power settings modified. However, herein term "cell" is used for the sake of clarity to cover the different electronic devices for transmitting and/or receiving data in radio waves, and thereby providing served devices access to communications network. Depending on an implementation, the determined action performed may be a status change (switching off cell(s) or switching on cell(s)), or one of the status change and modifying power settings of cell(s). Further, the radio access network node 230 reports measured load and throughput metrics to blocks 201, 202 and 203. It should be appreciated that training the load prediction model (block 201) may be performed in the near real time part 220 of the radio intelligent controller and/or in the radio access network node, and/or the determining optimal action (block 204) may be performed in the radio access network node, for example.

The training the load prediction model (block 201) and the Q learning (block 202) may be performed offline, whereas the other functions may be online functions. The predicting load periodically (block 203) depicts a trained load prediction model and determining the optimal action (block 204) depicts a trained power saving model, both models being updatable after retraining a corresponding neural network based model. For example, the Q learning may be a deep Q learning or basic Q learning. The basic Q learning uses a trainable Q function, which provides for any given pair of state and action a value. In the deep Q learning, a neural network model is trained to mimic (approximate) the trainable Q function.

It should be appreciated that the Q learning is used as an example of reinforcement learning, without limiting the solutions to the Q learning.

The load prediction model may be a machine learning based model, and it may be called also a load estimation model. Further, it should be appreciated that in some implementations, no machine learning based load prediction model is used to have a predicted load but a load is estimated based on measured load. Herein term "load estimate" is used to cover both, and the terms "load estimate" and "load prediction" may be interchangeably used.

Figure 3:
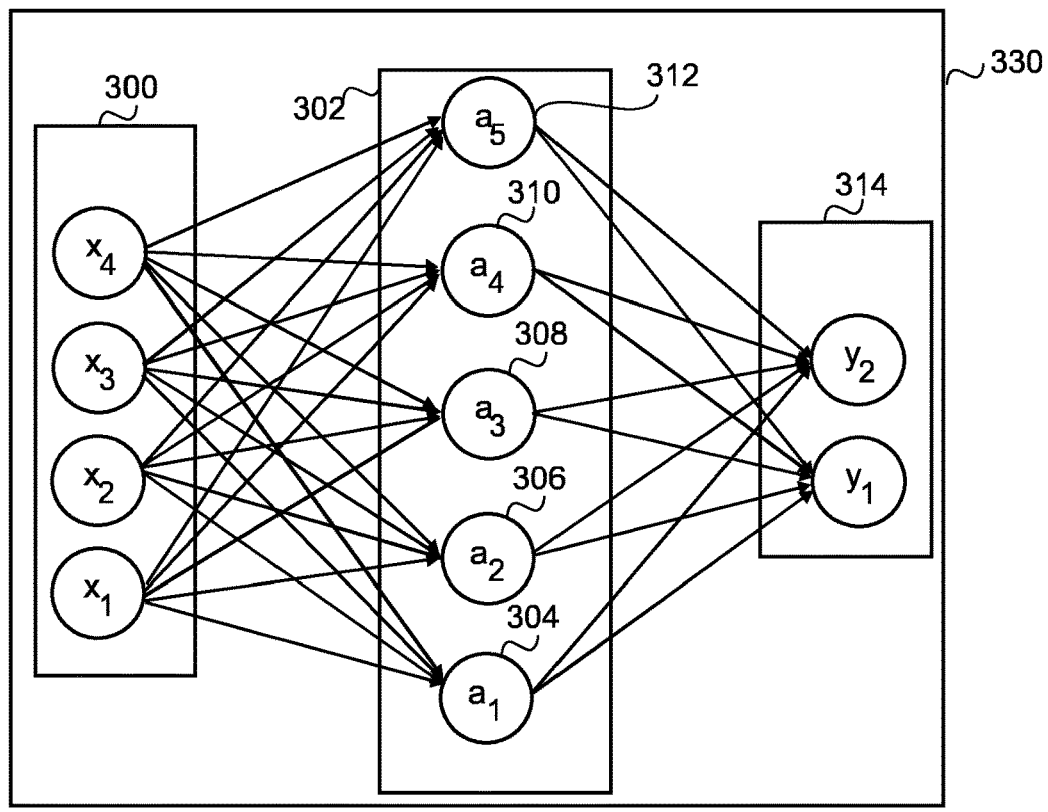
FIG. 3 is a block diagram illustrating an example of a neural network.
Figure 4:
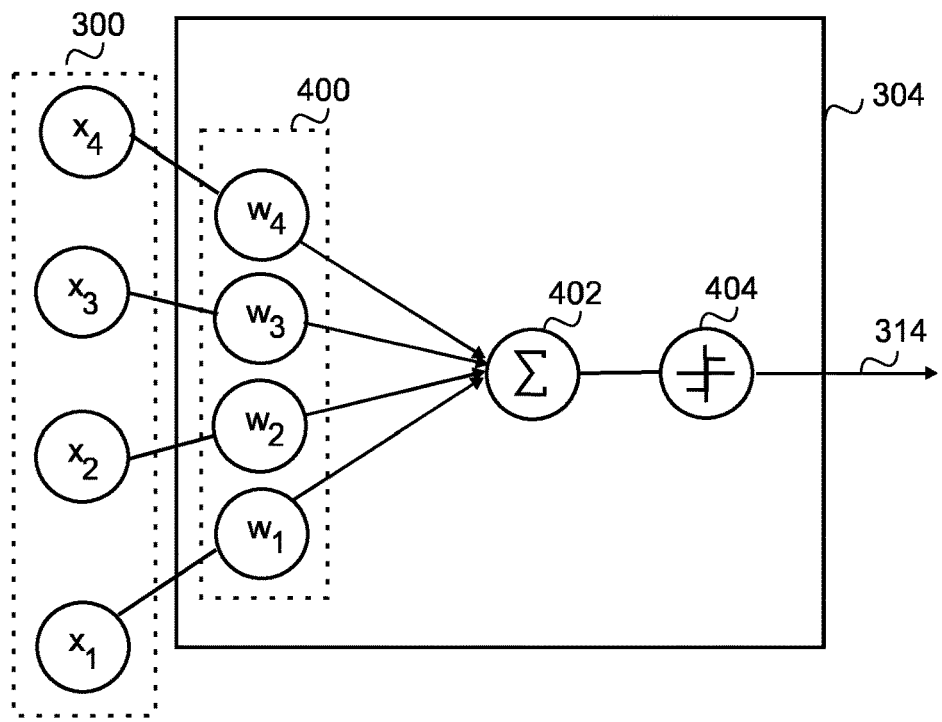
FIG. 4 is a block diagram illustrating an example of a computational node.

FIG. 3 illustrates an embodiment of the neural network 330 with one hidden layer, and FIG. 4 illustrates an embodiment of a computational node.

Deep learning (also known as deep structured learning or hierarchical learning) is part of a broader family of machine learning methods based on the layers used in artificial neural networks.

An artificial neural network (ANN) 330 comprises a set of rules that are designed to execute tasks such as regression, classification, clustering, and pattern recognition. The ANNs achieve such objectives with a learning procedure, where they are shown various examples of input data, along with the desired output. With this, they learn to identify the proper output for any input within the training data manifold. Deep learning typically requires a large amount of input data. Learning by using labels is called supervised learning and learning without labels is called unsupervised learning. Still a further learning method is reinforcement learning which does not use labels and the focus is on finding a balance between exploration (of uncharted territory) and exploitation (of current knowledge). The Q learning is a reinforcement learning algorithm.

A deep neural network (DNN) 330 is an artificial neural network comprising multiple hidden layers 302 between the input layer 300 and the output layer 314. Training of DNN allows it to find the correct mathematical manipulation to transform the input into the proper output even when the relationship is highly non-linear and/or complicated. In the deep Q learning, inputs to DNN are a state vector, and outputs are a vector of Q for all possible actions for that state.

Each hidden layer 302 comprise nodes 304, 306, 308, 310, 312, where the computation takes place. As shown in FIG. 4, each node 304 combines input data 300 with a set of coefficients, or weights 400, that either amplify or dampen that input 300, thereby assigning significance to inputs 300 with regard to the task the algorithm is trying to learn. The input-weight products are added 402 and the sum is passed through an activation function 404, to determine whether and to what extent that signal should progress further through the network 330 to affect the ultimate outcome, such as an act of classification. In the process, the neural networks learn to recognize correlations between certain relevant features and optimal results.

In the case of classification, the output of deep-learning network 330 may be considered as a likelihood of a particular outcome, such as in this case a probability of decoding success of a data packet. In this case, the number of layers 302 may vary proportional to the number of used input data 300. However, when the number of input data 300 is high, the accuracy of the outcome 314 is more reliable. On the other hand, when there are fewer layers 302, the computation might take less time and thereby reduce the latency. However, this highly depends on the specific DNN architecture and/or the computational resources.

Initial weights 400 of the model can be set in various alternative ways. During the training phase they are adapted to improve the accuracy of the process based on analyzing errors in decision making. Training a model is basically a trial and error activity. In principle, each node 304, 306, 308, 310, 312 of the neural network 330 makes a decision (input*weight) and then compares this decision to collected data to find out the difference to the collected data. In other words, it determines the error, based on which the weights 400 are adjusted. Thus, the training of the model may be considered a corrective feedback loop.

Typically, a neural network model is trained using a stochastic gradient descent optimization algorithm for which the gradients are calculated using the backpropagation algorithm. The gradient descent algorithm seeks to change the weights 400 so that the next evaluation reduces the error, meaning the optimization algorithm is navigating down the gradient (or slope) of error. It is also possible to use any other suitable optimization algorithm if it provides sufficiently accurate weights 400. Consequently, the trained parameters 332 of the neural network 330 may comprise the weights 400.

In the context of an optimization algorithm, the function used to evaluate a candidate solution (i.e. a set of weights) is referred to as the objective function. Typically, with neural networks, where the target is to minimize the error, the objective function is often referred to as a cost function or a loss function. In adjusting weights 400, any suitable method may be used as a loss function, some examples are mean squared error (MSE), maximum likelihood (MLE), and cross entropy.

As for the activation function 404 of the node 304, it defines the output 314 of that node 304 given an input or set of inputs 300. The node 304 calculates a weighted sum of inputs, perhaps adds a bias and then makes a decision as "activate" or "not activate" based on a decision threshold as a binary activation or using an activation function 404 that gives a nonlinear decision function. Any suitable activation function 404 may be used, for example sigmoid, rectified linear unit (ReLU), normalized exponential function (softmax), softplus, tan h, etc. In deep learning, the activation function 404 is usually set at the layer level and applies to all neurons in that layer. The output 314 is then used as input for the next node and so on until a desired solution to the original problem is found.

In examples below it is assumed that there is an ordered list of cells, for example C1, C2, . . . CN, and cells can be switched on in order C1, C2, . . . CN, and switched off in a reverse order CN, . . . C2, C1, 1 to N being cell numbers, N indicating the maximum number of cells. Herein, cells cover also different carriers in the same sector of the radio access network node, i.e. a carrier is herein a synonym to a cell. Further, it is assumed that at least historical load data (load traces) is available. Still a further assumption is that physical resource blocks provided in a cell are used as resources available in the cell. For the clarity of description, in the below examples it is assumed that an action is performed to a cell. However, an action may be performed to a plurality of cells.

The historical load data may be real-time messaging protocol (RTMP) data collected on streaming audio, video and/or data, for example. Load data, including the historical load data, may comprise various metrics of load. A non-limiting list of examples of various metrics includes a volume of a traffic arriving at or delivered by various cells in downlink and/or uplink (measured in bytes or megabytes, for example), air interface resources, for example physical resource blocks (PRBs) or data channel resources, or control channel resources, required to deliver the traffic, fraction of time/frequency resources consumed by uplink or downlink transmissions, number of devices connected to various cells, number of active devices, an active device being a device that have data ready to deliver, ratio of active devices to system bandwidth, expressed in Megahertz or in PRBs, an effective number of devices that may take into account the distribution or load-balancing of devices across multiple cells. The load data may also include a measure of the cell throughput, and/or a measure of device throughput such as geometric mean of devices throughputs. The load may comprise a vector or a tuple comprising one or more of the various metrics of load. It should be appreciated that any one of the load metrics may be measured over a certain time interval, for example 100 ms or 1 second or 1 minute or 15 minutes. The load metric may be an average over that interval, or a percentile (e.g. $90^{th}$ percentile) of measured load metrics within the interval, or a maximum value reached within the interval, etc. A historical trace or a time trace of load data may comprise a sequence of load metric values over a time range of time intervals, for example over a time range spanning 24 hours, wherein each load metric in the sequence is calculated over a time interval such as 1 second or 1 minute. The duration of the time interval and the range of time spanned by a historical load trace or time trace of load may be flexibly determined. The time traces or historical traces of load metrics collected over sufficiently long ranges of time may be used to train a model for predicting the load over a given time interval. This prediction may be, for example, based on a moving average of past load values, or merely the most recently observed load value, or be a forward-looking prediction determined by a trained neural network of a suitable form, or by other non-neural-network machine learning models, or the like.

Further, it should be appreciated that when a cell status is changed, i.e. the cell is switch on or off, served devices will be re-distributed amongst active cells, as is known. It should also be noted that herein the term "served device" covers, in addition to a device, like the user equipment, also a flow, a stream and a bearer to/from the device, i.e. the term "served device" refers to traffic of the served device. The served device may have one flow, or multiple flows, and/or one stream, or multiple streams, and/or one bearer, or multiple bearers. In other words, "a served device" may refer to the entire data traffic, including user data and control data, of said served device, or may refer to a part of the data traffic of said served device.

Figure 5:
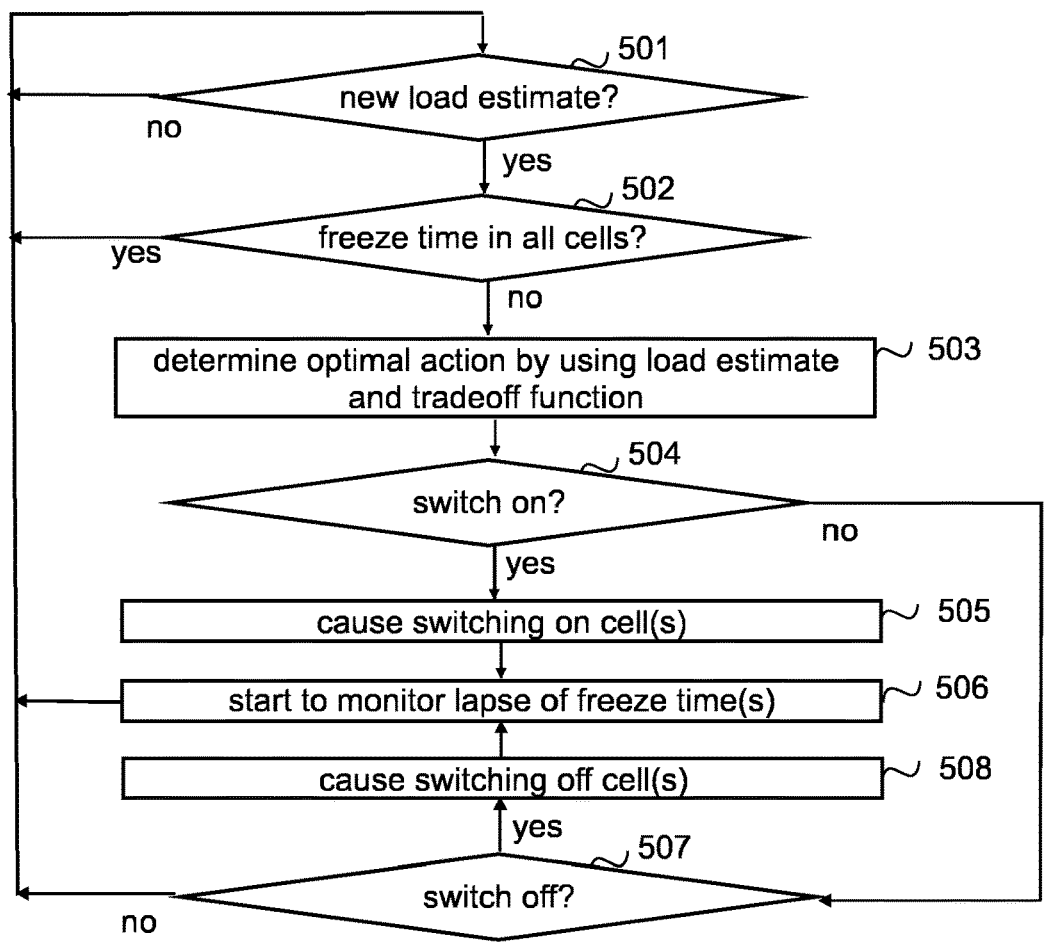
FIG. 5 illustrates an example functionality.

FIG. 5 illustrates basic functionality of the trained power saving model or an apparatus comprising the trained power saving model, for example, to decide when to switch on or off one or more cells so that long term reward is maximized, i.e. a long term objective of power savings versus ensuring throughput (capacity) is balanced. Further, in the example of FIG. 5 it is assumed that after an action causing one or more cells being switched on or off, a so called freeze time is set per a cell switched on or off, during which freeze time the cell is not allowed to be switched on or off. In other words, during the freeze time of a cell, the cell status cannot be changed. Depending on an implementation, a freeze time after a cell is switched on may be different than a freeze time after a cell is switched off, or the same freeze time may be used after both actions. However, it should be appreciated that the functionality may be implemented without a freeze time. Still a further assumption is that load estimates are received periodically. The time interval for load estimates may be set freely, for example to be 1 minute or 15 minutes. The same applies to the freeze time, it may be set freely, to be 5 minutes or 10 minutes or half an hour.

Referring to FIG. 5, it is monitored (block 501) whether a new load estimate is received. The new load estimate may be received from the load predictor model, or the load estimate may be determined by the apparatus, or by the power saving model, based on load data measured by random access network node(s), or the load estimate may be a combination of a load predictions and load data measured. Use of load predictions as load estimates facilitates proactive switching on/off of one or more cells. Furthermore, load value at time t, for which the optimal action is determined, may not be measurable before the action is performed.

If a new load estimation is received (block 501: yes), it is checked in block 502 whether there is freeze time left in all cells, i.e. whether there is any cell that can be switched on or off, because its freeze time has lapsed. If all cells have the freeze time left (block 502: yes), no status change is possible and the process returns to block 501 to monitor whether a new load estimate is received.

If there are one or more cells whose freeze time has lapsed, i.e. there are one or more cells whose status can be changed, an optimal action amongst possible actions, which in the illustrated example are "switch on", "switch off", and "do nothing" (do nothing means that the current status is retained), is determined in block 503 by using the load estimate and a tradeoff function. In one implementation, candidate cells may be determined before the optimal action is determined, and possible actions may be restricted to the candidate cells. A candidate cell is a cell whose freeze time has lapsed.

The tradeoff function may define for each possible action a long term reward and the optimal action is the action providing the biggest reward. The tradeoff function takes into account conflicting objectives relating to switching on or off one or more cells. On the one hand, switching off one or more cells may reduce power consumption. On the other hand, switching off one or more cells may reduce air interface resources available for transmissions to/from served devices, and thereby reduce the throughput experienced by users of the served devices. A network operator may wish to reduce the power consumption, but may also not be willing to have a high impact on the throughput. Hence, the network operator is faced by a tradeoff—reducing the power consumption by switching off one or more cells may come at the cost of an impact on throughput, while increasing the throughput may require consuming additional power by switching on one or more additional cells. The tradeoff function represents a way to quantify the relative importance given by the network operator to the two conflicting objectives of improving the throughput and reducing the power consumption. In an implementation, the tradeoff function may be calculated as a function of the throughput achieved, the power consumed, and a relative weight representing the relative importance of the throughput function and the power consumption function. In another implementation, the tradeoff function may be provided by the network operator as a policy input, by specifying the function of the throughput to use in calculating the tradeoff, the function of the power consumption, and the relative weight. The function of the throughput may be considered as a benefit function, and the function of the power consumption may be considered as a penalty function. The benefit function, for example, may be a utility function of an effective throughput per a served device. In an implementation, the benefit function may be a logarithm of the throughput per a served device, multiplied by scaling or normalizing constants and the number of physical resource blocks. In an implementation, the tradeoff function may form the basis of the reward calculation to be used in reinforcement learning for determining the optimal action to be performed. The reward may calculated, for example, using a simple reward function (equation 1):

$$R(\text{load}, \text{current\_cells}, \text{action}) = F(\text{Throughput}, \text{new\_cells}) - \beta * \text{Power}(\text{new\_cells})$$

wherein
R is a reward,
load is the load estimate,
current_cells are the set of currently active cells, i.e. cells that have been switched on earlier and whose freeze time has lapsed (if freeze time is used),
action is one of {switch_on_new_cell, switch_off_cell, do_nothing}
F is a benefit function on throughput
new_cells is the set of active cells after taking the action (which could be the same as current_cells, if the action is do_nothing)
$\beta$ is a relative weight, received as a policy or configuration input
Power is a penalty function on power consumption The relative weight $\beta$ is preferably a positive number, for example a real number having a value that is bigger than 0 and at most 1, or an integer bigger than or equal to 1, or an integer between a range, such as an integer between 1 and 100, just to give non-limiting examples of the relative weight. For example, in an implementation in which the benefit function F is a function whose result is between 0 and 1, for example by performing a normalization (e.g. relative to the maximum value attained at the maximum throughput), and the power consumed is normalized by the maximum power consumption so that the power is also expressed as a number between 0 and 1, having the relative weight as a real number between 0 and 1 provides a relative weighting that is commensurate to the range of the benefit function on throughput and the power (penalty function on power consumption).

Following equation (2) defines another reward function and may be used in block 503:

$$R(S(t), A(t)) = F1 - F2$$

wherein $$F1 = \sum_{c=1}^{N\_cells(t)} \left( \text{PRB\_eff}(t, c) * \text{N\_eff}(t, c) * \log\left(\frac{\text{T\_cell}(t, c)}{\text{N\_eff}(t, c)}\right) \right)$$

$$F2 = \beta * P(\text{N\_cells}(t))$$

$$N\_eff(t, c) = N\_active(t, c) + \sum_{c=N\_cells(t)+1}^{N\_max\_cells} \frac{N\_active(t, c)}{N\_max\_cells - N\_cells(t)}$$

wherein

R is a reward for taking action A(t) in state S(t)

F1 captures the benefit based on throughput provided by active cells after taking the action F2 captures the penalty of power consumption for keeping a cell active c indicates a cell and the order of the cell and is 1, 2, . . .

N_max_cells (i.e the maximum number of cells)

t is current time

S(t) is state at current time.

A(t) is action {switch_on_new_cell, switch_off_cell, do_nothing} taken in state S(t) and assumed to happen instantaneously, N_cells(t) is the number of active cells after taking the action, PRB_eff (t,c) are physical resource blocks in use for user data in an active cell c after taking the action, N_eff(t,c) is an effective new number of served devices in the active cell c after taking the action, assuming equally distributed streams (after the number of active cells has changed), N_active(t,c) is the number of active served devices in the cell c at time t before taking the action, T_cell(t,c) is an active throughput in the cell c at time t, β is the relative weight, P is the power consumption of the set of active cells after taking the action.

It should be appreciated that the active throughput in the cell c at time t, i.e. T_cell(t,c), may be determined based on load measurement reports, i.e. load data, received from one or more radio access nodes. The active throughput in the cell cat time t will depend on the distribution of served devices and interference in the cell. The assumption in the equation (2) uses a coarse approximation in which it is assumed that a cell throughput, including spatial distribution of served devices within the cell and interference caused by other cells, does not change after changing a status of another cell, but the effective number of served devices in the cell changes. Naturally more accurate ways to determine the active throughput in the cell c at time t may be used, for example receiving reports on served devices throughputs in addition to cell throughputs.

The power consumption may be based on power measurement reports received from the one or more radio access nodes. A radio access node may monitor and report power consumed per a time interval. Hence, based on past power measurement reports it is relatively straightforward to estimate (or predict) what will be the power consumption after taking the action, as the new set of active cells after the action is known. Basically power consumption of a cell depends mainly on the number of time/frequency resources on which the cell is transmitting.

At the simplest the state S(t) may be the current_cells, or (load, current_cells) since the freeze time is taken into account in block 502. However the state may be (current_cells, freeze_state), or (load, current_cells, freeze_state), the freeze_state indicating whether switch on/off is allowed. For example, as long as freeze_state=1, no further switch on/off actions are allowed.

If the selected action is cell on (block 504: yes), i.e. switch on cell, switching on a cell is caused in block 505, and monitoring lapse of the freeze time is started in block 506. Then the process returns to block 501 to monitor whether a new load estimate is received. If the process is performed in another apparatus than an apparatus, for example a base station, providing the cell(s), the causing means that a command to perform the action is sent to said apparatus providing the cell(s).

If the selected action is cell off, i.e. switch off cell, (block 504: no, block 507: yes), switching off a cell is caused in block 508, and monitoring lapse of the freeze time is started in block 506. Then the process returns to block 501 to monitor whether a new load estimate is received. If the process is performed in another apparatus than an apparatus, for example a base station, providing the cell(s), the causing means that a command to perform the action is sent to said apparatus providing the cell(s).

If the selected action is "do nothing" (block 504: no, block 507: no), the process returns to block 501 to monitor whether a new load estimate is received.

In implementations in which the possible optimal actions include also modifying power settings of one or more cells, block 502 may be omitted in implementations allowing modifying power settings of a cell while there is still freeze time left (freeze time has not lapsed).

It should be appreciated that the process of FIG. 5 may be triggered also by another event than receiving a new load estimate. The process may be triggered, for example, also when a freeze time of one or more cells lapsed.

Figure 6:
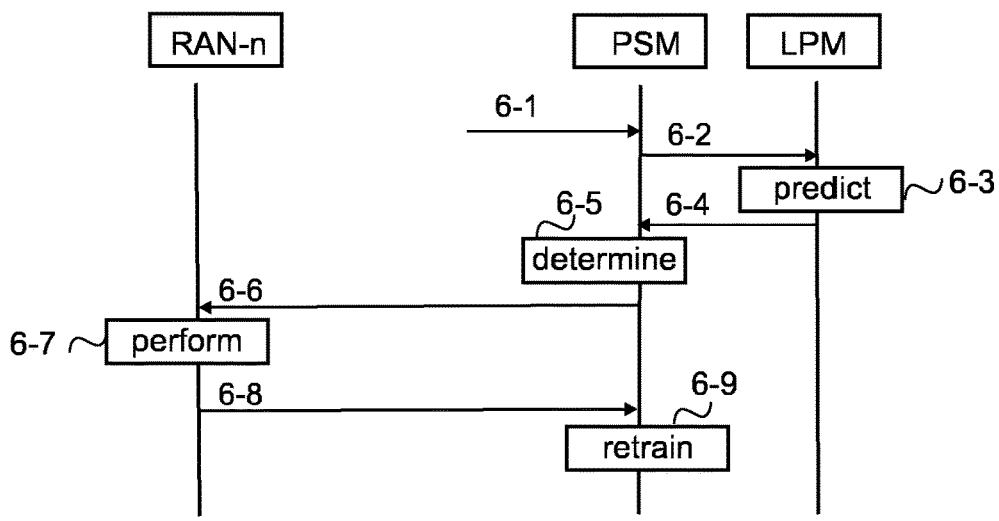
FIG. 6 illustrates an example of information exchange.

FIG. 6 illustrates an example of information exchange between a radio access node RAN-n, the power saving model PSM and the load prediction model LPM. To keep the description concise, the information exchange focuses on new features specific for power saving optimization, and details relating to measurements and how they are configured are not discussed, even though they are performed. Further, it should be appreciated that the RAN-n depicts herein a plurality of RAN-ns Referring to FIG. 6, the PSM receives in message 6-1 policy for the PSM by means of a policy API (application programming interface). The policy may comprise the relative weight and the freeze time (freeze state duration), for example.

Then the PSM initiates the LPM by sending message 6-2 by means of a power saving API. Message 6-2 is a load prediction request, or load estimation request, for a particular cell/cells with additional attributes. The additional attributes may include, for example, a prediction interval, and/or duration of the averaging window (if moving average used) and/or a type of prediction, examples of types including predicted average load and predicted $90^{th}$ percentile of load, etc. It should be appreciated that the above is not an exhaustive list of the additional attributes.

The LPM predicts in block 6-3 the load, i.e. outputs the load prediction, and sends in message 6-4 the load prediction, or a load estimate, to the PSM by means of a load prediction API. (The details of how the LPM receives load data from RAN-n for load predictions bears no significance to the PSM functionality, and hence there is no need to describe that in more detail herein. As is known, there are several ways to convey the load data.)

The PSM determines. in block 6-5 the action to be taken. The PSM may be a reinforcement learning based model, for example using Q learning as described above with FIG. 5.

In the illustrated example it is assumed that the optimal action decided is either switch on cell or switch off cell, and hence the PSM sends in message 6-6 the cell on/off decision to the RAN-n by means of a data write API.

The RAN-n performs the action in block 6-7, i.e. switches on or off the cell. Further, the RAN-n performs in block 6-7 monitoring as requested/configured (request not illustrated in FIG. 6), and continue sending RAN data (periodic RAN data), the RAN data covering herein load data, power consumed etc., reported by the RAN-n, at requested time granularity in messages 6-8, for example once in a minute, in 15 minutes, etc. (1/15 min etc.), by means of the data write API. The RAN data corresponds to the respective load KPIs (key performance indicators) and performance (throughput), required for updating the PSM, i.e. the power saving Q learning model (power saving Q function), and the LPM, i.e. the load model. For example, the RAN-n may monitor and report per a cell c and per a time unit t, following: Active_state(t,c), PRB(t,c), N_eff(t,c), Power_consumed(t, c), T_cell(t,c), T_user(t,c), freeze_state(t,c). The value of the time unit t may be the same or smaller than the periodicity of the RAN data. In the illustrated example, the PSM retrains in block 6-9 the power saving Q learning model using additional data, i.e. data in message(s) 6-8. The initial Q learning model may have been obtained by using in the training historical data that may be possibly for some other cells or other part of the network, and so the initial Q function may not exactly represent the particular cells we will apply the Q function to. So we start with the initial Q function, and start determining actions based on that, but then we also observe RAN data from the specific cells in question, and update/retrain the Q function based on the observed data.

When the time interval for predictions is lapsed, the LPM performs a new load prediction (block 6-3) and the information exchange continues therefrom according to what is described above. Blocks 6-3 and 6-9 describe one instance of power saving decision and learning.

Figure 7:
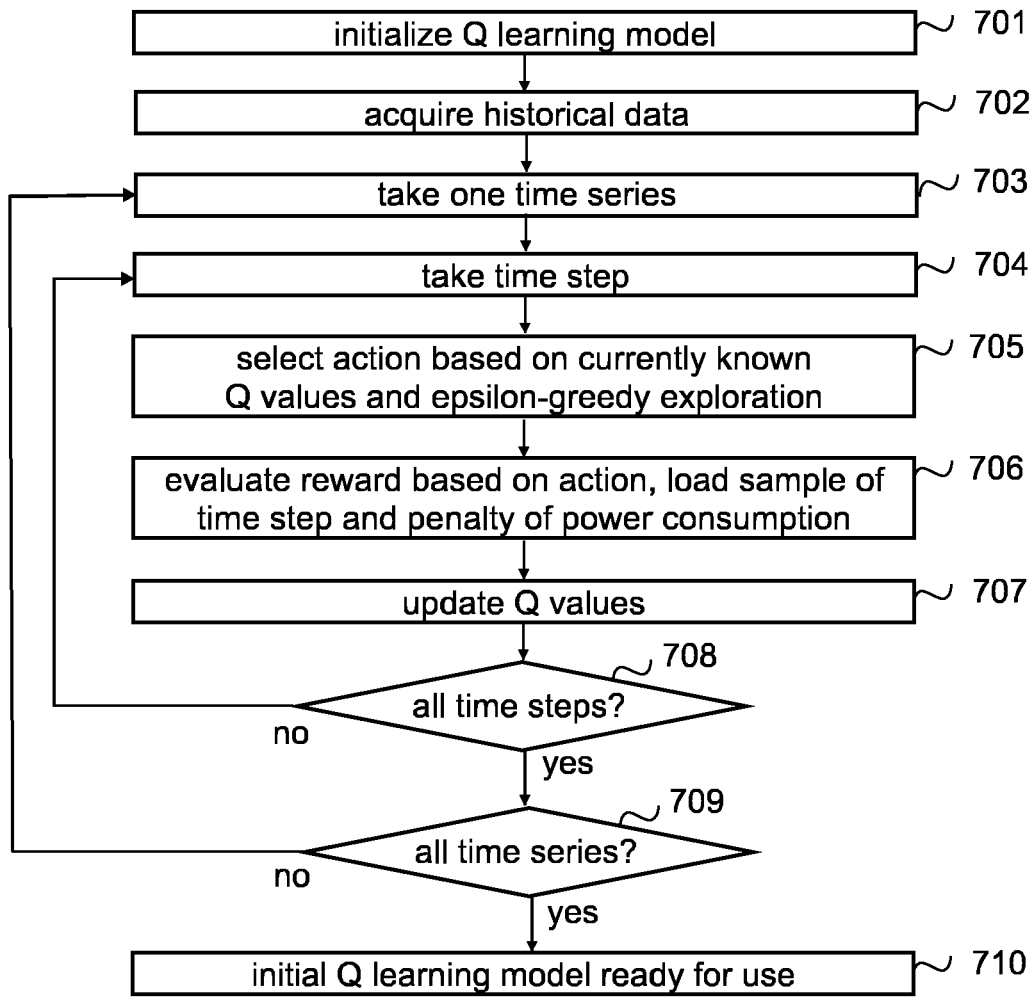
FIGS. 7 to 10 are flow charts illustrating example functionalities.
Figure 9:
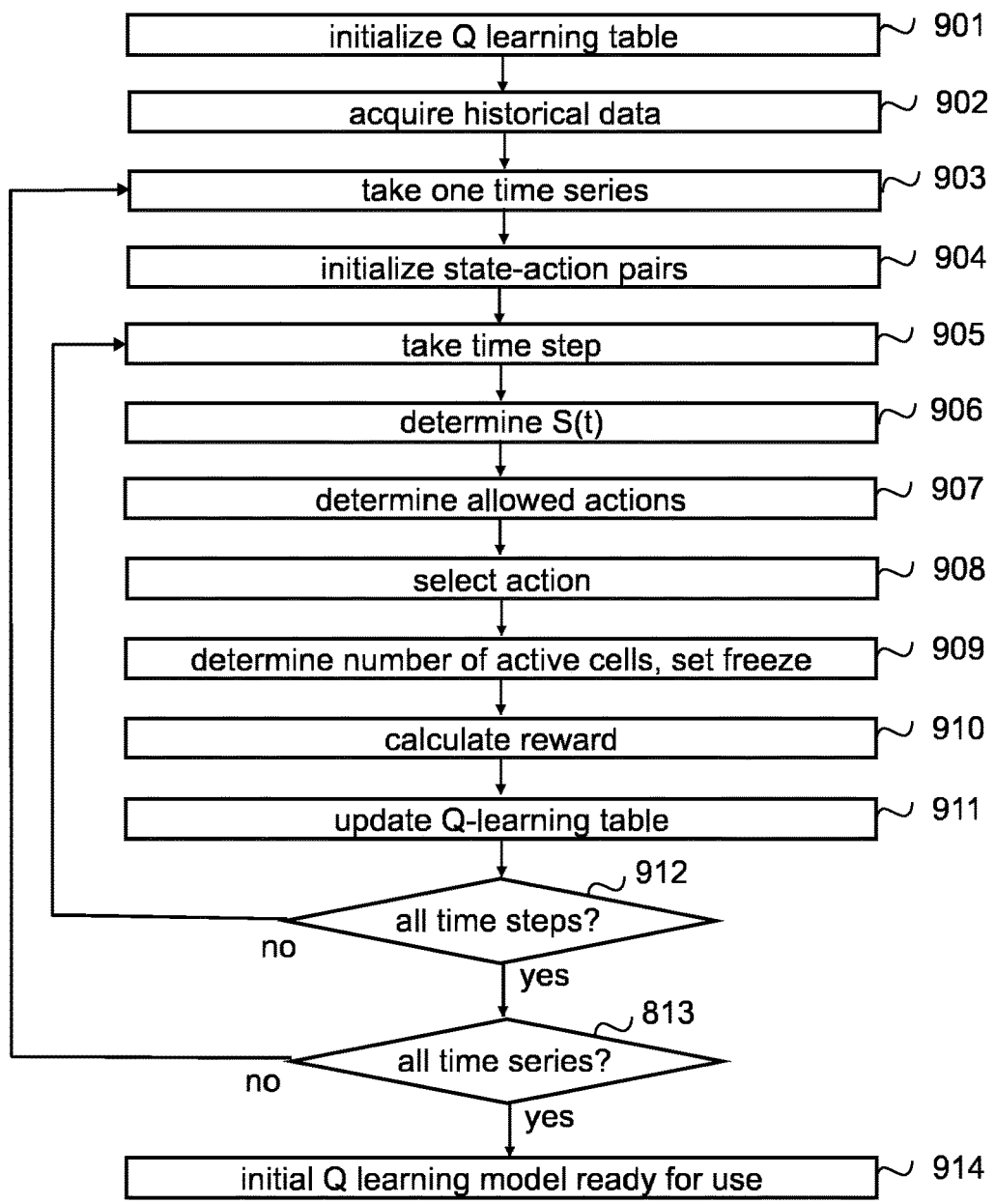

It may be that in a first instance of the power saving decision and learning, when an initial Q learning model is used, the Q learning model may not exactly represent the particular cells the model is applied to in block 6-3, since the initial Q learning model may be a result of offline training that uses historical data of some other cells or other part of the radio access network. However, the more often retraining in block 6-9, using RAN data of the particular cells the better the retrained Q learning model represents the particular cells. FIGS. 7 and 9 illustrate different ways to train an initial Q learning model, i.e. the power saving model that has not yet updated/retrained using feedback (reports from radio access network nodes), using multi-episode simulation.

In both examples it is assumed that the historical data is offline data that comprises a plurality of time series providing evolution of load data (for example by means of number of active served devices, and/or physical resource blocks used), power consumption data and cell throughput data. The load data is used to identify the state, and the throughput/power related metrics to identify the reward attainable. In some implementations, the historical data may comprise a plurality of time series providing evolution of served device(s) throughput data. The historical data may be, for example, in time series of one hour duration, one time series comprising a plurality of time steps, for example a plurality of one minute granularity load samples. For example, having historical data collected during a week will result with one hour time series to 168 time series. Further assumption made is that per a time step throughput is also known, or determinable based on the historical data. For example, per a sample in the load time series may comprise, per a cell, may comprise a tuple representing number of active served devices and physical resource block (PRB) utilization at a given time period, which may be a time step within the time interval, the time interval, plurality of time intervals. The tuple may comprise also cell throughput at the given time interval. The tuple for load may be expanded to for example a mean and a variance of the load (tuple) components, or a mean and Xth percentiles of the load components.

It is also assumed that when the number of active cells changes due to switching on or off one or more cells, served devices get distributed across the new set of cells, and the new throughput, or load, after taking the action is the throughput before the action multiplied by the number of cells before the action and divided by the number of cells after the action. In other implementations, a load-balancing model to predict how load would be distributed and how much throughput would be obtainable after switching on or off cells may be used.

One time series, for example an one hour sample, may be considered as an episode for training, or to be like a horizon for the Q learning model.

Usually the offline data represent the historical data with a fixed number of cells, not taking into account switching on or off one or more cells. Use of such data set captures baseline variability of load and the resulting throughput. For the Q learning model data sets capturing baseline variability provide good training data.

Referring to FIG. 7, the training process starts in block 701 by initializing the Q learning model, and by acquiring in block 702 the historical load data. The model may be initialized in block 701, for example, by setting the initial value of the Q function for all pairs (state, action) to 0. Another non-limiting example how the model may be initialized in block 701 includes setting the initial value to a high constant number for all (state, action) pairs, so that early in the learning process the actions that have not yet been tried will be selected with higher likelihood. This allows more exploration during the initial part of the training phase and can speed up Q learning.

Then in block 703 one time series is taken to be processed, and from the time series one time step is taken to be process in block 704. An action is then selected, based on currently known Q values in the Q learning model and epsilon-greedy exploration. The reward is then evaluated in block 706 based on the action selected, a load sample, for example the throughput of the time step, and penalty of the power consumption. For example, the equation (2) may be used in block 706 to evaluate the reward, the evaluation of a reward resulting from an action being determined. Then the Q values in the Q learning model are updated in block 707 accordingly.

After that it is checked in block 708, whether all time steps within the time series, which was taken in block 703 to be processed, have been processed. If not (block 708: no), the process continues to block 704 to take the next time step to be processed.

If all time steps within said time series have been processed (block 708: yes), it is checked in block 709, whether all time series in the historical data have been processed. If not (block 709: no), the process continues to block 703 to take the next time series to be processed.

If all time series have been processed (block 709: yes), the initial Q learning model is trained and ready for use (block 710), and to be retrained during use, as described above and with FIG. 8.

As can be seen, the training in FIG. 7 iterates over each time series (over multiple episodes) and over multiple time steps.

The currently used Q learning model may be (re)trained online. The retraining may be triggered, when a report comprising RAN data is received from a radio access network node, as described with FIG. 6, or if the radio access network node comprises the Q learning model, when the report is ready, for example, and the RAN data thereby received. Further examples that may trigger the retraining include detecting that a sufficient amount of data (for example over a certain time duration, such as 1 day) has been accumulated based on the RAN data or detecting that the observed throughput has diverged more than a preset threshold (or a preset threshold within a preset time) from the assumed throughput used for calculating the reward.

Figure 8:
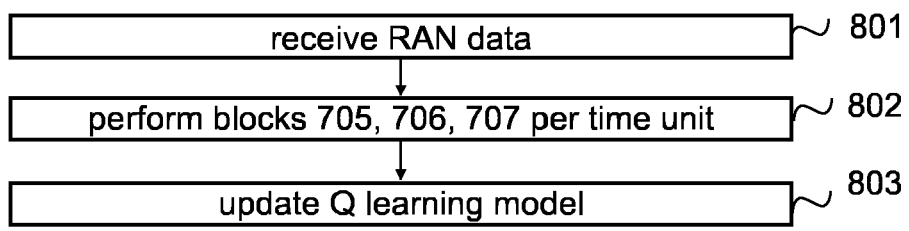

Referring to FIG. 8, when the RAN data is received in block 801, the above described blocks 705, 706, 707 of FIG. 7 are performed in block 802 per a time unit used in the report. In other words, the time unit corresponds to the time step used in training the initial Q learning model. However, the durations of the time step and the time unit may be different. More precisely, blocks 705, 706, 707 of FIG. 7 are repeated in block 802 starting from the oldest RAN data so that all RAN data will be used. For example, if reporting periodicity is 15 minutes and the time unit is 3 minutes, blocks 705, 706, 707 of FIG. 7 are repeated 5 times. Then the Q learning model in use is updated to correspond to the end result of block 802.

Referring to FIG. 9, the training process starts in block 901 by initializing a Q learning table (the Q learning model), for example as described with FIG. 7, and by acquiring in block 902 the historical data. To keep the Q learning table size a small, loads, i.e. L(t), may be quantized in block 901.

Then in block 903 one time series is taken to be processed, and cell states of all cells for the time series are initialized in block 904 with corresponding actions. For example, default values may be used. (The loads, i.e. L(t), may also be quantized in block 903.) Then, from the time series one time step is taken to be process in block 905 and a state is determined for the time step t, for example using following equation (3):

$$S(t)=(L(t),N\_cells(t-1),freeze(t))$$

wherein N_cells(t−1) is the number of active cells that resulted from the action selected in the previous time step.

Then in block 907 allowed actions are determined based on the value of freeze(t). If freeze(t)=1, the allowed action is {do_nothing}, else the allowed actions are {switch_on, switch_off, do_nothing}.

After that an action is selected in block 908. The selection may be performed using following logic in pseudocode:

If Q(S(t),A(t))=0 for all A(t), or with probability epsilon:
  let A(t)=random selection from allowed actions
Else select A(t)=argmax Q(S(t),A(t)) over all allowed A(t)
wherein
A(t) denotes action in the time step,
probability epsilon is either a constant value or a value decaying during time step iterations.

The value of the probability epsilon may be a default value, for example a value set during initializing the Q learning table.

When the action has been selected, number of active cells (N_cells(t)) after the action is performed is determined in block 909, and freeze is set in block 909 to be according to the selected action. For example, assuming that freeze time T last longer than the time step t, following logic in pseudocode may be followed:

If A(t)!=do_nothing:
  Freeze(t+1)=Freeze(t+2)= . . . =Freeze(t+T)=1
Else Freeze(t+1)=0

The reward is then calculated in block 910 based on the action selected, a load sample, for example the throughput of the time step, and penalty of the power consumption. For example, the equation (2) may be used in block 910 to calculate the reward, resulting to reward value R(S(t),A(t)) for the time step. Then the Q learning algorithm is updated in block 911, for example using following equation (4):

$$Q(S(t),A(t))=(1-\alpha)*Q(S(t),A(t))+\alpha*[R(S(t),A(t))+\gamma*\max\_AQ(S(t+1),A(t+1))]$$

wherein
t denotes situation before the selected action happens and t+1 after the selected action has happened,
α=learning rate
γ=discount factor The learning rate and discount factor may be default values, for example set during initializing the Q learning table.

After updating the Q learning algorithm, it is checked in block 912, whether all time steps within the time series, which was taken in block 903 to be processed, have been processed. If not (block 912: no), the process continues to block 905 to take the next time step to be processed.

If all time steps within said time series have been processed (block 912: yes), it is checked in block 913, whether all time series in the historical data have been processed. If not (block 913: no), the process continues to block 903 to take the next time series to be processed.

If all time series have been processed (block 913: yes), the Q learning model is trained and ready for use (block 914), and to be retrained during use, as described above.

As can be seen, the training in FIG. 9 also iterates over each time series (over multiple episodes) and over multiple time steps.

In another implementation, the state-action pairs are initialized for all time series before processing individual time steps. In other words, block 904 is performed to time series before block 903 is performed.

The currently used Q learning model may be (re)trained online. The retraining may be triggered, when a report comprising RAN data is received from a radio access network node, as described with FIG. 6, or if the radio access network node comprises the Q learning model, when the report is ready, for example, and the RAN data thereby received. Further examples that may trigger the retraining include detecting that a sufficient amount of data (for example over a certain time duration, such as 1 day) has been accumulated based on the RAN data or detecting that the observed throughput has diverged more than a preset threshold (or a preset threshold within a preset time) from the assumed throughput used for calculating the reward.

Figure 10:
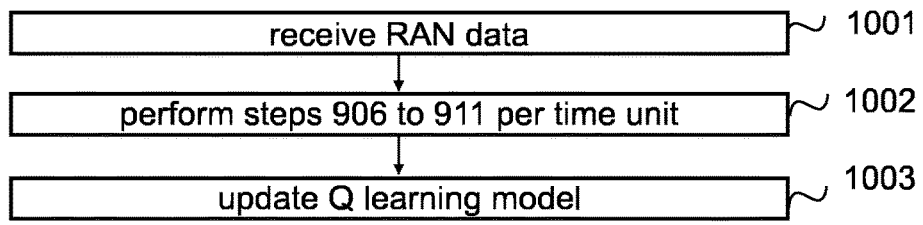

Referring to FIG. 10, when the RAN data is received in block 1001, the above described blocks 906 to 911 of FIG. 9 are performed in block 1002 per a time unit used in the report. In other words, the time unit corresponds to the time step used in training the initial Q learning model. However, the durations of the time step and the time unit may be different. More precisely, blocks 906 to 911 of FIG. 9 are repeated in block 1002 starting from the oldest RAN data so that all RAN data will be used. For example, if reporting periodicity is 15 minutes and the time unit is 3 minutes, blocks 906 to 911 of FIG. 9 are repeated 5 times. Then the Q learning model in use is updated to correspond to the end result of block 1002.

As can be seen from the above examples, it is possible to balance the power saving and throughput performance without assuming any throughput/power model and learning from the environment. Further, there is no need for pre-set thresholds to determine when cells can be switched on or off. When the long term reward is maximized (optimized), it is possible to enhance network performance.

The blocks, related functions, and information exchanges described above by means of FIGS. 2 to 10 are in no absolute chronological order, and some of them may be performed simultaneously or in an order differing from the given one. Other functions can also be executed between them or within them, and other information may be transmitted, and/or other machine learning methods applied. Some of the blocks or part of the blocks or one or more pieces of information can also be left out or replaced by a corresponding block or part of the block or one or more pieces of information.

Figure 11:
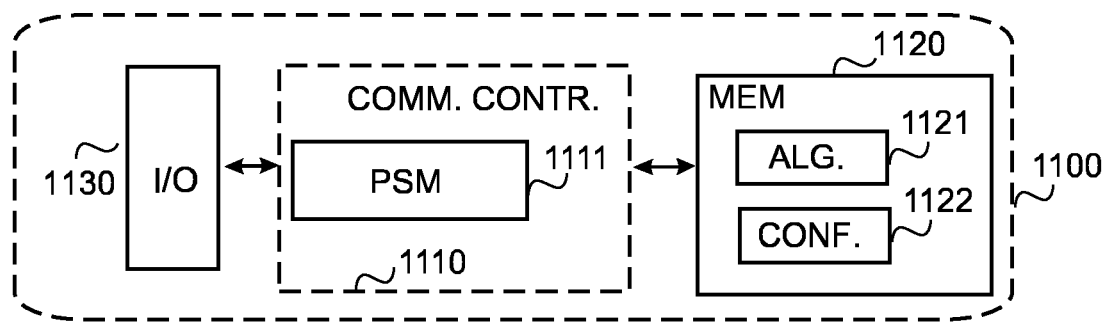
FIGS. 11 and 12 are schematic block diagrams.
Figure 12:
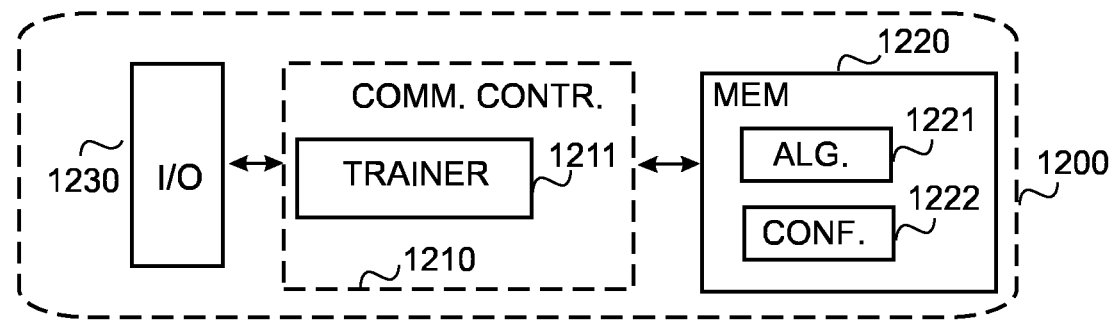

FIGS. 10 and 11 illustrate apparatuses comprising a communication controller 1010, 1110 such as at least one processor or processing circuitry, and at least one memory 1020, 1120 including a computer program code (software, algorithm) ALG. 1021, 1121, wherein the at least one memory and the computer program code (software, algorithm) are configured, with the at least one processor, to cause the respective apparatus to carry out any one of the embodiments, examples and implementations described above. FIG. 10 illustrates an apparatus configured to at least determine an optimal action for a group of cells by using a trained model, and FIG. 11 illustrates an apparatus configured to train and/or retrain the trained model. Naturally, the apparatuses may be merged, i.e. the apparatus may be configured to determine an optimal action for a group of cells by using a trained model, and at least to retrain the model. The apparatuses of FIGS. 10 and 11 may be electronic devices. Different examples of such devices are given above.

Referring to FIGS. 10 and 11, the memory 1020, 1120 may be implemented using any suitable data storage technology, such as semiconductor based memory devices, flash memory, magnetic memory devices and systems, optical memory devices and systems, fixed memory and removable memory. The memory may comprise a configuration storage CONF. 1021, 1121, such as a configuration database, for at least temporarily storing RAN data, i.e. reports received on cells, and/or policy definitions, for example relative weight and freeze time settings, and/or default values for training, etc. The memory 1020, 1120 may further store other information, for example xAPI definitions.

Referring to FIG. 10, the apparatus 1000 may further comprise a communication interface 1030 comprising hardware and/or software for realizing communication connectivity at least according to one or more radio communication protocols. The communication interface 1030 may provide the apparatus with communication capabilities, over a wired connection and/or over a radio connection, with one or more base stations (access nodes) of a wireless network. The communication interface may comprise standard well-known analog radio components such as an amplifier, filter, frequency-converter and circuitries, conversion circuitries transforming signals between analog and digital domains, and one or more antennas. Digital signal processing regarding transmission and/or reception of signals may be performed in a communication controller 1010.

The apparatus 1000 may further comprise an application processor (not illustrated in FIG. 10) executing one or more computer program applications to interact with the open platform of O-RAN. The application processor may execute computer programs forming the primary function of the apparatus. If the apparatus is an access node, the application processor may execute access applications. In an embodiment, at least some of the functionalities of the apparatus of FIG. 10 may be shared between two physically separate devices, forming one operational entity. Therefore, the apparatus may be seen to depict the operational entity comprising one or more physically separate devices for executing at least some of the processes described with respect to a power saving module in an apparatus, or as an apparatus in the RIC-non-RT.

The communication controller 1010 may comprise one or more trained models (PSM) 1011 configured to at least determine an optimal action to be performed according to any one of the embodiments/examples/implementations described above.

Referring to FIG. 11, the apparatus for training comprises a communication interface 1130 comprising hardware and/or software for realizing communication connectivity according to one or more communication protocols. The communication interface 1130 may provide the apparatus with communication capabilities with one or more apparatuses comprising trained models for determining an optimal action, and/or with one or more with one or more base stations (access nodes) of a wireless network. The communication interface may comprise standard well-known components such as an amplifier, filter, frequency-converter, (de)modulator, and encoder/decoder circuitries and one or more antennas.

The communication controller 1110 comprises a trainer circuitry TRAINER 1111 configured to train one or more trainable functions for at least initially training a trained model for determining an optimal action according to any one of the embodiments/examples/implementations described above.

In an embodiment, at least some of the functionalities of the apparatus of FIG. 11 may be shared between two physically separate devices, forming one operational entity. Therefore, the apparatus may be seen to depict the operational entity comprising one or more physically separate devices for executing at least some of the processes described with respect to the training.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone (smart phone) or a similar integrated circuit in a server, a cellular network device, or another network device.

In an embodiment, at least some of the processes described in connection with FIGS. 2 to 10 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform (carry out) at least some of the functionalities according to any one of the embodiments/examples/implementations of FIGS. 2 to 10, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
    at least one processor; and
    at least one memory including computer program code, the at least one memory and computer program code configured to, with the at least one processor, cause the apparatus at least to perform:
    determining, for a group of cells in a radio access network, an optimal action, using a first trained model, which is based on reinforcement learning and maximizes a long term reward on tradeoff between throughput and power saving within the group of cells, the first trained model taking as input a state, wherein the optimal action is one of actions comprising at least modifying power settings of one or more cells, switching on one or more cells, switching off one or more cells, and retaining the current cell statuses in cells of the group of cells, and wherein the state comprises at least one of a load estimate and, per a cell in the group of cells, a current cell status;
    causing the optimal action to be performed in response to the optimal action being modifying power settings of one or more cells, or switching on one or more cells, or switching off one or more cells, and
    applying, after an optimal action that is either switching on one or more cells or switching off one or more cells is caused to be performed to one or more cells, per a cell of the one or more cells, a freeze time, wherein during the freeze time switching on the one or more cells, or switching off the one or more cells is not possible.

2. The apparatus of claim 1, wherein the at least one memory and computer program code are configured to, with the at least one processor, cause the apparatus further at least to perform:
    receiving load and performance metrics of cells that are switched on, and power consumed by the cells that are switched on; and
    updating the first trained model in response to the receiving load and performance metrics of cells that are switched on, and power consumed by the cells that are switched on.

3. The apparatus of claim 1, wherein the at least one memory and computer program code are configured to, with the at least one processor, cause the apparatus further at least to perform the determining in response to receiving, as a new load estimate, a new load prediction from a second trained model comprised in the apparatus or in another apparatus, the second trained model outputting periodically, using at least measured load data from the radio access network as input, load predictions.

4. The apparatus of claim 1, wherein the at least one memory and computer program code are configured to, with the at least one processor, cause the apparatus further at least to perform:
instantiating and running the first trained model as a service on top of a radio intelligent controller near real time platform; and
using a data write application programming interface of the radio intelligent controller near real time platform, when causing the optimal action to be performed.

5. A method comprising:
determining, for a group of cells in a radio access network, an optimal action, using a first trained model, which is based on reinforcement learning and maximizes a long term reward on tradeoff between throughput and power saving within the group of cells, the first trained model taking as input a state, wherein the optimal action is one of actions comprising at least modifying power settings of one or more cells, switching on one or more cells, switching off one or more cells, and retaining the current cell statuses in cells of the group of cells, and wherein the state comprises at least one of a load estimate and, per a cell in the group of cells, a current cell status;
causing the optimal action to be performed in response to the optimal action being modifying power settings of one or more cells, switching on one or more cells, or switching off one or more cells; and
applying a freeze time after an optimal action that is either switching on one or more cells or switching off one or more cells is caused to be performed, wherein during the freeze time switching on the one or more cells or switching off the one or more cells is not possible.

6. The method of claim 5, further comprising:
receiving load and performance metrics of cells that are switched on, and power consumed by the cells that are switched on; and
updating the first trained model in response to the receiving load and performance metrics of cells that are switched on, and power consumed by the cells that are switched on.

7. The method of claim 5, the method further comprising performing the determining in response to receiving, as a new load estimate, a new load prediction from a second trained model comprised in the apparatus or in another apparatus, the second trained model outputting periodically, using at least measured load data from the radio access network as input, load predictions.

8. The method of claim 5, the method further comprising:
instantiating and running the first trained model as a service on top of a radio intelligent controller near real time platform; and
using a data write application programming interface of the radio intelligent controller near real time platform, when causing the optimal action to be performed.

9. The method of claim 5, the method further comprising using Q learning as the reinforcement learning.

10. A non-transitory computer readable medium comprising program instructions for causing an apparatus to perform at least one of a first process and a second process,
wherein the first process comprises at least:
determining, for a group of cells in a radio access network, an optimal action, using a first trained model, which is based on reinforcement learning and maximizes a long term reward on tradeoff between throughput and power saving within the group of cells, the first trained model taking as input a state, wherein the optimal action is one of actions comprising at least modifying power settings of one or more cells, switching on one or more cells, switching off one or more cells, and retaining the current cell statuses in cells of the group of cells, and wherein the state comprises at least one of a load estimate and, per a cell in the group of cells, a current cell status; and
causing the optimal action to be performed in response to the optimal action being modifying power settings of one or more cells, or switching on one or more cells, or switching off one or more cells,
wherein the second process comprises at least:
initializing a first trainable model, which maximizes a long term reward on tradeoff between throughput and power saving in a radio access network comprising cells and which first trainable model outputs an optimal action, wherein the optimal action is one of actions comprising at least modifying power settings of one or more cells, switching on one or more cells, switching off one or more cells, and retaining the current cell statuses;
acquiring historical data comprising a plurality of time series of evolution of at least load data, power consumption data, and cell throughput data in the radio access network, time series comprising a plurality of time steps;
training the first trainable model to a first trained model using reinforcement learning and iterating the plurality of time series and by iterating, per a time series, the plurality of time steps; and
applying a freeze time after an optimal action that is either switching on one or more cells or switching off one or more cells is caused to be performed, wherein during the freeze time switching on the one or more cells or switching off the one or more cells is not possible.

11. An apparatus comprising:
at least one processor; and
at least one memory including computer program code, the at least one memory and computer program code configured to, with the at least one processor, cause the apparatus at least to perform:
initializing a first trainable model, which maximizes a long term reward on tradeoff between throughput and power saving in a radio access network comprising cells and which first trainable model outputs an optimal action, wherein the optimal action is one of actions comprising at least modifying power settings of one or more cells, switching on one or more cells, switching off one or more cells, and retaining the current cell statuses;
acquiring historical data comprising a plurality of time series of evolution of at least load data, power consumption data, and cell throughput data in the radio access network, time series comprising a plurality of time steps;
training the first trainable model to a first trained model using reinforcement learning and iterating the plurality of time series and by iterating, per a time series, the plurality of time steps;
determining, for a group of cells in the radio access network, the optimal action, using the first trained model, which is based on reinforcement learning and maximizes the long term reward on tradeoff between throughput and power saving within the group of cells, the first trained model taking as input a state, wherein the state comprises at least one of a load estimate and, per a cell in the group of cells, a current cell status;

causing the optimal action to be performed in response to the optimal action being modifying power settings of one or more cells, or switching on one or more cells, or switching off one or more cells; and applying a freeze time after an optimal action that is either switching on one or more cells or switching off one or more cells is caused to be performed, wherein during the freeze time switching on the one or more cells or switching off the one or more cells is not possible.

12. A method comprising:

initializing a first trainable model, which maximizes a long term reward on tradeoff between throughput and power saving in a radio access network comprising cells and which first trainable model outputs an optimal action, wherein the optimal action is one of actions comprising at least modifying power settings of one or more cells, switching on one or more cells, switching off one or more cells, and retaining the current cell statuses;

acquiring historical data comprising a plurality of time series of evolution of at least load data, power consumption data, and cell throughput data in the radio access network, time series comprising a plurality of time steps;

training the first trainable model to a first trained model using reinforcement learning and iterating the plurality of time series and by iterating, per a time series, the plurality of time steps;

determining, for a group of cells in the radio access network, the optimal action, using the first trained model, which is based on reinforcement learning and maximizes the long term reward on tradeoff between throughput and power saving within the group of cells, the first trained model taking as input a state, wherein the state comprises at least one of a load estimate and, per a cell in the group of cells, a current cell status;

causing the optimal action to be performed in response to the optimal action being modifying power settings of one or more cells, switching on one or more cells, or switching off one or more cells; and applying a freeze time after an optimal action that is either switching on one or more cells or switching off one or more cells is caused to be performed, wherein during the freeze time switching on the one or more cells or switching off the one or more cells is not possible.

\* \* \* \* \*